Nov. 4, 1952 — G. E. DATH — 2,616,685
FRICTION SHOCK ABSORBER FOR RAILWAY CAR TRUCKS
Filed Aug. 4, 1949 — 2 SHEETS—SHEET 1

Inventor:
George E. Dath.
By Henry Fuchs.
Atty.

Nov. 4, 1952 — G. E. DATH — 2,616,685
FRICTION SHOCK ABSORBER FOR RAILWAY CAR TRUCKS
Filed Aug. 4, 1949 — 2 SHEETS—SHEET 2

Inventor:
George E. Dath.
By Henry Fuchs.
Atty.

Patented Nov. 4, 1952

2,616,685

UNITED STATES PATENT OFFICE 2,616,685

FRICTION SHOCK ABSORBER FOR RAILWAY CAR TRUCKS

George E. Dath, Mokena, Ill., assignor to W. H. Miner, Inc., Chicago, Ill., a corporation of Delaware Application August 4, 1949, Serial No 108,510

3 Claims. (Cl. 267—9)

1

This invention relates to improvements in friction shock absorbers especially adapted for use in connection with trucks of railway cars for snubbing or dampening the action of the truck springs.

One object of the invention is to provide a friction shock absorber of the character set forth, comprising a casing, follower members at opposite ends of the casing movable toward and away from the same, cushioning means within the casing, and wedge blocks at opposite sides of said cushioning means in wedging engagement with the followers and casing for compressing said cushioning means transversely.

A further object of the invention is to provide a friction shock absorber, comprising a casing having interior wedge faces between the ends thereof, hollow followers in the form of caps at opposite ends of the casing, movable toward and away from the same, and having opposed, interior wedge faces thereon, a rubber block within the casing, and friction wedge blocks at opposite sides of said rubber block, wherein the rubber block is compressed lengthwise between said hollow followers upon inward movement of the latter and the wedge blocks are wedged laterally inwardly toward each other by wedging engagement with the followers and wedge faces of the casing to compress said rubber block laterally.

Other objects of the invention will more clearly appear from the description and claims hereinafter following.

Figure 1:
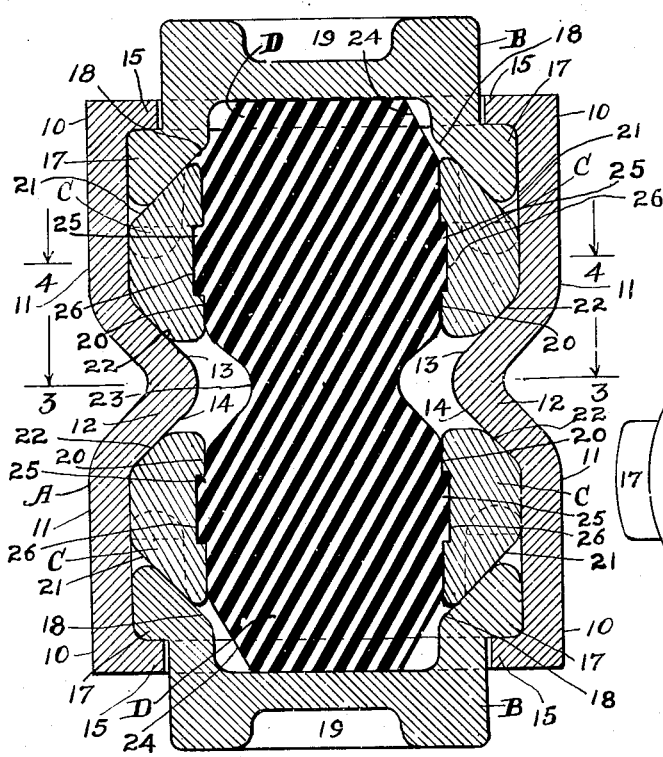
Figure 5:
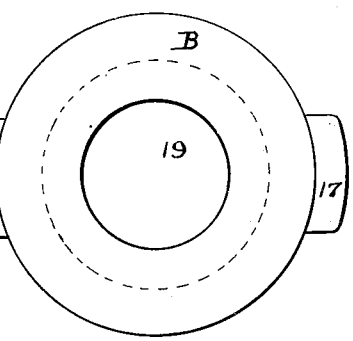
Figure 2:
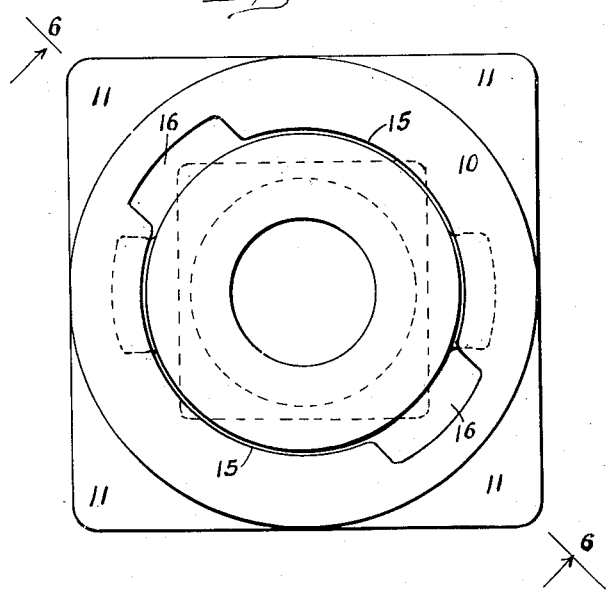
Figure 6:
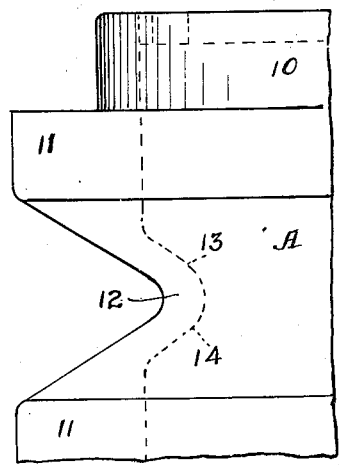
Figure 3:
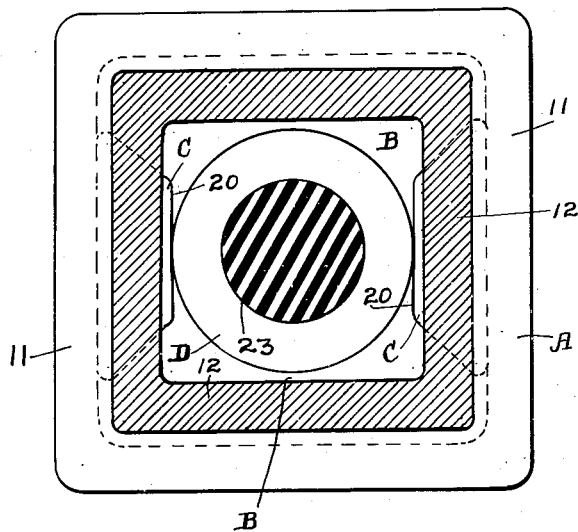
Figure 7:
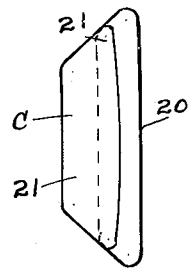
Figure 4:
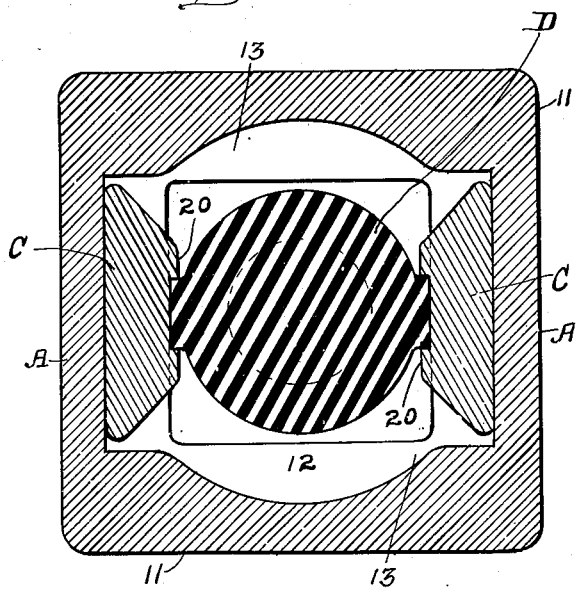
Figure 8:
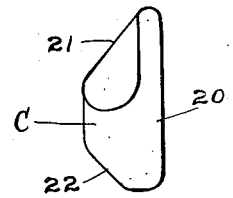

In the accompanying drawings forming a part of this specification, Figure 1 is a transverse, vertical sectional view of my improved friction shock absorber. Figure 2 is a top plan view of Figure 1. Figures 3 and 4 are horizontal sectional views, corresponding respectively to the lines 3—3 and 4—4 of Figure 1. Figure 5 is a top plan view of the top wedge cap or follower shown in Figure 1. Figure 6 is a broken elevational view, looking in the direction of the line 6—6, indicated in Figure 2. Figure 7 is a top plan view of the upper left hand friction wedge block shown in Figure 1. Figure 8 is a side elevational view of Figure 7, looking from left to right in said figure.

As shown in the drawings, my improved shock absorber comprises broadly a casing A, top and bottom wedge caps B—B, top and bottom pairs of wedge blocks C—C and C—C, and a rubber block D.

The casing A is in the form of an elongated, tubular member open at its top and bottom ends. The top and bottom end portions of the casing

2

A are of circular cross section, as indicated at 10—10, thus providing cylindrical end portions, between said portions 10—10, the main body of the casing being of square, boxlike cross section, as indicated at 11. The mid portions of the vertical side walls of the casing are pressed inwardly to provide interior wedge projections 12—12. Each wedge projection 12 presents upper and lower wedge faces 13 and 14, which converge in lateral inward direction with respect to the casing. The cylindrical top and bottom end portions 10—10 of the casing are provided with laterally inwardly directed, annular flanges 15—15, each flange 15 being provided with a pair of diametrically opposite openings or slots 16—16, forming passageways through which certain retaining lugs of the corresponding wedge caps may be passed in assembling the parts of the mechanism, as hereinafter described. As seen in Figure 2, the diametrical axis of the slots 16—16 is coincident with a vertical plane extending through diagonally opposite corners of the casing A.

The top and bottom wedge caps B—B are of similar design. Each cap B is in the form of a cylindrical cup-shaped member, having diametrically opposite, laterally outwardly projecting retaining lugs 17—17, adapted to cooperate with the flange 15 at the corresponding end of the casing A. The top and bottom caps B—B are slidingly telescoped within the top and bottom ends 10—10 of the casing, with the lugs 17—17 and 17—17 respectively engaged in back of the flanges 15—15 in the normal position of the parts to limit outward movement of the caps. On the inner side, each cap presents a pair of opposed, transverse wedge faces 18—18 at its lower end adapted to engage with cooperating wedge faces on the wedge blocks C—C at the corresponding end of the mechanism. Each cap B is provided with an outwardly opening, central seat 19, the central seat of the upper cap being adapted to accommodate the usual spring centering projection of the top follower plate of the spring cluster of a railway car truck, and that of the lower cap being adapted to accommodate the usual centering projection of the bottom follower plate of said cluster.

The wedge blocks C—C and C—C are arranged in pairs at opposite ends of the mechanism, each pair being interposed between the wedge faces 18—18 of the corresponding follower cap B and the wedge projections 12—12 of the casing A. The four wedge blocks C—C—C—C are of similar design, each block having a flat, substantially vertical face 20 on its inner side, and wedge faces 21 and 22 on its outer side at opposite ends thereof. The blocks of the top pair are interposed between the top wedge cap B and the wedge projections 12—12 of the casing A, the blocks of said pair being diametrically opposed to each other. Each of said top blocks C has the wedge faces 21 and 22 at the upper and lower ends thereof, respectively, the wedge face 21 engaging the wedge face 18 at the corresponding side of the cap B and the wedge face 22 engaging the wedge face 13 of the wedge projection 12 at the corresponding side of the casing A. The wedge blocks C—C of the bottom pair are interposed between the bottom wedge cap B and the wedge projections 12—12 of the casing A, the blocks of said pair being diametrically opposed to each other, and in vertical alignment with the top blocks C—C. Each of said bottom blocks has the wedge faces 21 and 22 at the lower and upper ends thereof, respectively, the wedge face 21 engaging the face 18 at the corresponding side of the bottom cap B, and the wedge face 22 engaging the wedge face 14 of the projection 12 at the corresponding side of the casing A.

The rubber block D is in the form of an elongated member of substantially cylindrical cross section, reduced or contracted at its center, as indicated at 23, and having upper and lower end portions 24—24, with taper outwardly. The block D has its top and bottom ends bearing on the inner sides of the top and bottom wedge caps B—B and is embraced at opposite sides by the wedge blocks C—C and C—C, the top wedge blocks C—C embracing the upper end portion, and the bottom wedge blocks embracing the lower end portion of said block. The block D is anchored to the blocks C—C and C—C by laterally projecting lugs 25—25 and 25—25 thereon, engaged in seats 26—26—26—26 provided on the inner sides of the blocks C—C—C—C.

In assembling the mechanism, the rubber block D and the top and bottom wedge blocks C—C and C—C are first placed within the casing A. The top and bottom caps B—B are then telescoped within the top and bottom ends of the casing A, with the lugs 17—17 and 17—17 of the caps aligned with the openings 16—16 and 16—16 of the flanges 15—15 at the top and bottom ends of the casing, each cap being forced inwardly until the lugs thereof are disposed inwardly clear of the corresponding flange 15. Each cap B is then given a partial turn to bring the lugs in holding position in back of said flange, as shown in Figure 2, thereby locking each cap against removal.

My improved shock absorber preferably replaces one or more of the spring units of a truck spring cluster of a railway car, being interposed between the top and bottom spring plates of said cluster.

The operation of my improved shock absorber is as follows: Upon the spring cluster of the truck of a railway car being compressed between the spring follower plates of the cluster, the top wedge cap B is forced downwardly toward the bottom wedge cap B, thereby compressing the rubber block D in lengthwise direction. At the same time, the top cap B is forced inwardly of the casing A, and the latter downwardly over the bottom cap B, both caps being thus, in effect, forced inwardly of the casing against the blocks C—C and C—C, forcing the latter against the wedge projections 12—12 and thereby wedging the blocks of each pair laterally inwardly toward each other to compress the rubber block D therebetween in transverse direction. High shock absorbing capacity is thus produced by both longitudinal and transverse compression of the rubber block D, and by frictional resistance between the wedge faces of the blocks C—C—C—C and the wedge faces of the caps B—B and the casing A, to snub the action of the truck springs.

Upon recoil of the truck springs, the pressure on the top wedge cap B is reduced, thereby permitting restoration by the rubber block D of all of the parts of the mechanism to the normal fully expanded position shown in Figure 1, outward movement of the wedge caps B—B, with respect to the casing A, being positively limited by engagement of the lugs 17—17 and 17—17 of the caps B—B with the flanges 15—15 of the casing.

I claim:

1. In a friction shock absorber, the combination with a casing open at opposite ends and having interior, opposed wedge projections between its ends; of wedge caps slidingly telescoped within opposite ends of the casing; laterally opposed wedge blocks at opposite ends of the casing, the blocks at each end of said casing having wedging engagement with the wedge projections of said casing and the corresponding wedge caps; and a rubber block within the casing between said wedge blocks and bearing at opposite ends on said wedge caps, and opposing lengthwise approach of said caps and lateral approach of said blocks.

2. In a friction shock absorber, the combination with a casing open at opposite ends and having interior, opposed wedge projections between its ends; of wedge caps slidingly telescoped within opposite ends of the casing; laterally opposed wedge blocks at opposite ends of the casing, the block at each end of the casing having wedging engagement with the wedge projections of said casing and the corresponding wedge cap; and a rubber block within the casing bearing at opposite ends on said caps and closely embraced between said wedge blocks to yieldingly oppose longitudinal approach of said wedge caps and lateral approach of said blocks.

3. In a friction shock absorber, the combination with a friction casing open at opposite ends and having interior, opposed wedge projections between its ends at opposite sides thereof; of opposed wedge blocks within said casing at opposite ends thereof having their inner ends in wedging engagement with said wedge projections; follower caps at opposite ends of the casing sliding telescoped within the same, each cap having opposed, interior wedge faces in wedging engagement with the outer ends of the blocks at the corresponding end of the casing; and a rubber block disposed between the wedge blocks at opposite ends of the casing and closely embraced thereby, said rubber block having its opposite ends extending into said follower caps and buttressed against the latter.

GEORGE E. DATH.

REFERENCES CITED

The following references are of record in the file of this patent:

UNITED STATES PATENTS

| Number | Name | Date |
|---|---|---|
| 1,510,332 | O'Connor | Sept. 30, 1924 |
| 1,836,186 | O'Connor | Dec. 15, 1931 |
| 1,988,427 | Barrows | Jan. 15, 1935 |
| 2,194,792 | Herndon | Mar. 26, 1940 |
| 2,372,936 | Cottrell | Apr. 3, 1945 |